March 4, 1952      C. A. ROSTINE      2,587,652
BRAKING MECHANISM FOR HOSE REELING APPARATUS
Filed May 14, 1949      2 SHEETS—SHEET 1
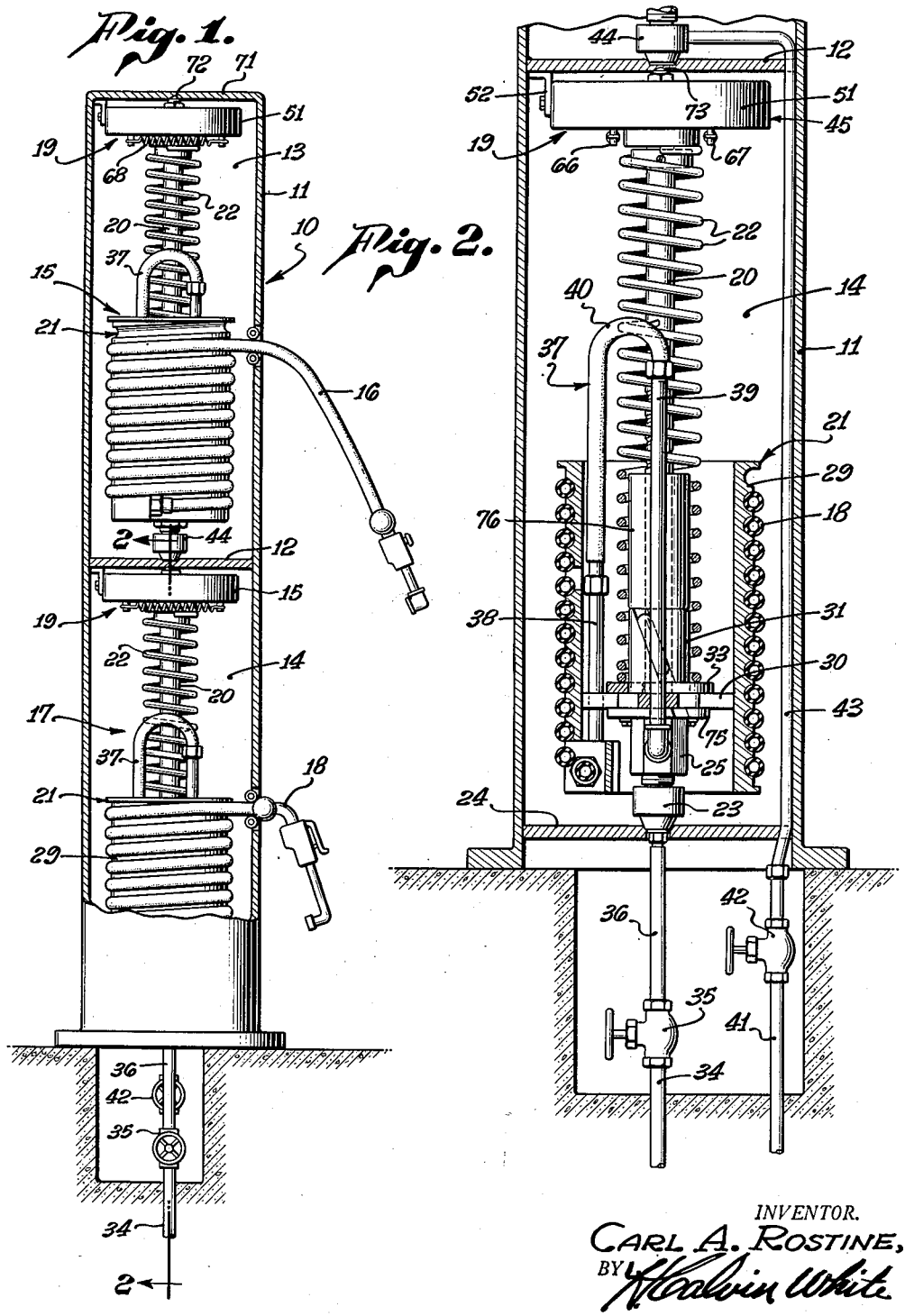
INVENTOR.
CARL A. ROSTINE,
BY
ATTORNEY.

March 4, 1952  C. A. ROSTINE  2,587,652
BRAKING MECHANISM FOR HOSE REELING APPARATUS
Filed May 14, 1949  2 SHEETS—SHEET 2
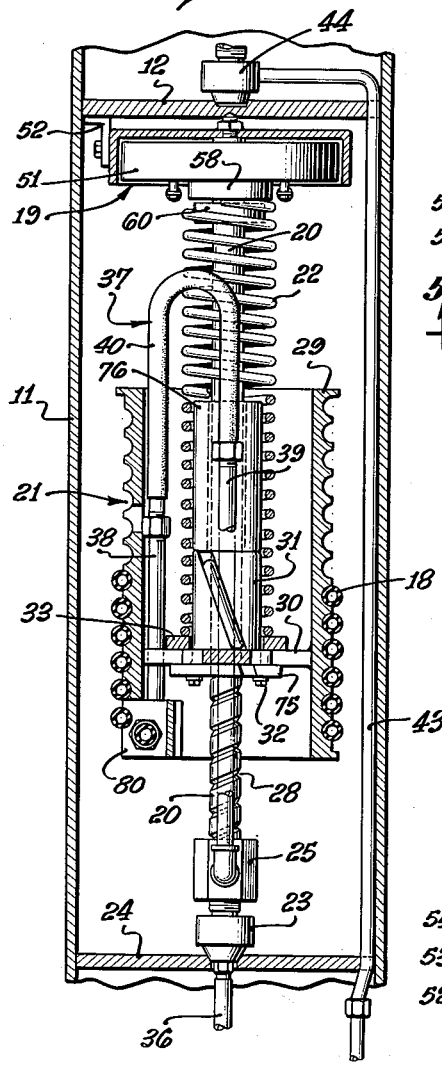
INVENTOR.
CARL A. ROSTINE,
BY
ATTORNEY.

Patented Mar. 4, 1952

2,587,652

UNITED STATES PATENT OFFICE 2,587,652

BRAKING MECHANISM FOR HOSE REELING APPARATUS

Carl A. Rostine, Gardena, Calif., assignor, by mesne assignments, to John Wood Manufacturing Company, Inc., New York, N. Y., a corporation of Delaware Application May 14, 1949, Serial No. 93,373

14 Claims. (Cl. 242—86)

1

The present invention is concerned generally with automatic hose reeling equipment, as for instance that used in the dispensing of air and water at service stations, and is more specifically directed to novel brake means for controlling the hose take-up or retracting speed of such equipment.

It is, of course, highly important that hose reeling equipment intended for service station use be structurally compact and capable of accommodation within a relatively small housing. In view of this necessity for compactness, a major object of the present invention is to provide a braking device for limiting the hose take-up speed of a reeling mechanism and especially designed to be housed, with the reeling apparatus, in a space meeting the dimensional requirements for service station use.

An additional object of the invention is to provide braking apparatus particularly adapted for use in conjunction with any hose winding device of the general type shown in my co-pending application Serial Number 80,137, filed March 8, 1949. For example, in certain of its aspects, the invention broadly contemplates the use of brake mechanism for controlling the operation of a drum mounted for rotation about a vertical axis, as is the drum shown in the above application. For this purpose, I preferably employ a brake disposed in vertical alinement with the drum in a manner such that the drum and brake together cooperate most effectively and occupy a minimum of space. In other more specific aspects, the invention provides braking apparatus for controlling the retracting motion of a drum mounted for axial movement, as also exemplified by the apparatus of the above application.

Structurally, I prefer to employ a centrifugal braking mechanism adapted for rotation with the reeling drum and operable, upon the attainment of a predetermined take-up speed, to exert a restraining or braking force preventing further increase in speed. For maximum simplicity and effectiveness, I may dispose the drum and brake in such relation that a spring operable to effect rotation of the drum in a hose retracting direction is also adapted to transmit that rotation from the drum to the brake.

The above and further features and objects of the present invention will be better understood from the following detailed description of the typical embodiment illustrated in the accompanying drawings, in which:

Fig. 1 is a vertical section through a preferred form of water and air hose reeling apparatus embodying the invention;

2

Fig. 2 is a fragmentary enlarged vertical section taken on line 2—2 of Fig. 1;

Fig. 3 is a view corresponding to that of Fig. 2 showing the condition of the reeling apparatus with the water hose partially withdrawn;

Fig. 4 is an enlarged fragmentary vertical section through the braking mechanism; and Fig. 5 is a horizontal section taken on line 5—5 of Fig. 4 and including a bottom view of the braking mechanism.

I have illustrated a water and air dispensing column for service station use corresponding in many respects to the apparatus shown in my copending application Ser. No. 80,137. Referring first to Fig. 1, the column, generally indicated at 10, includes a vertically extending cylindrical housing 11, divided interiorly by horizontal partition 12 into upper and lower spaces 13 and 14. Space 13 contains reeling equipment 15 for automatically winding air hose 16, and space 14 contains reeling mechanism 17 for automatically winding water hose 18.

The two reeling mechanisms are substantially identical, and therefore I have only shown in detail the lower mechanism 17. Also, each reeling unit is essentially the same as that shown in the above application, with the exception of the added braking apparatus 19 and certain changes associated with the addition of the braking mechanism.

Each reeling apparatus comprises essentially a central screw shaft 20, a drum unit 21 mounted for axial and rotational movement relative to the shaft, a spring 22 normally urging the drum downwardly to the position of Fig. 2 and adapted to transmit rotation of the drum to the brake mechanism, and a braking unit 19. The two shafts 20 are stationarily mounted in the illustrated vertically extending positions within spaces 13 and 14, respectively. The lower of these shafts is mounted at its lower end to bottom 24 of the housing by inlet fitting 23 and swivel inlet 25, and at its upper end to partition 12 by reception of upwardly projecting stud 26 within recess 73 in the partition. The upper shaft 20 is similarly mounted at its lower end to partition 12 by inlet fitting 44, and at its upper end to top wall 71 of the housing by stud 72.

Each drum unit 21 comprises a cylindrical drum 29 about which the hose is wound and having a transverse inner frame element 30 rigidly connected, as by bolts 32, to bottom flange 75 of vertically extending nut 31. As will be understood, the nut engages groove 28 in the shaft to movably mount the drum unit to the shaft, the pitch and design of groove 28 being such that the exertion of an axial force against the drum effects both its axial and rotational movements. Above frame element 30, I provide annular washer or ring 33 extending about the nut and against which spring 22 exerts a downward force. Spring 22 is centered relative to the shaft by nut 31, sleeve 76 which is slidably carried about the shaft above the nut, and collar 60 which is rigidly secured to the shaft near its upper end by set screw 61, each of which has an external diameter slightly less than the internal diameter of the spring.

As in the above application, water is supplied to hose 18 through inlet line 34, valve 35, line 36, inlet fitting 23, swivel connection 25, flexible U-shaped supply conduit 37, and drum-carried fitting 80. Conduit 37 comprises a pair of rigid pipes 38 and 39 and a flexible intermediate tube or portion 40 which forms a reverse curve advanceable axially with the drum during movement relative to the axially stationary swivel fitting 25. Air is supplied to the upper hose by inlet line 41 through valve 42, line 43, fitting 44 at the bottom of space 15, and swivel and flexible fittings corresponding to those of the lower reeling mechanism.

Referring now to Figs. 4 and 5, the brake mechanism comprises an outer stationary brake drum 45 and an inner rotatable centrifugally actuated mechanism 46. Brake drum 45 has a horizontal top wall 47 with a central opening 48 through which stud 26 passes, and carries on its upper surface nut 49 threadedly engageable by the stud to retain wall 47 tightly against transverse upper surface 50 of the shaft. Extending downwardly from the outer edge of wall 47, drum 45 includes vertical cylindrical side wall 51, which is fixed against rotation by connection with angle 52 through screw bolt 53, the angle in turn being secured to the housing as by welding at 54.

The inner rotatable brake mechanism 46 includes a hub 55, mounted for rotation relative to the shaft by ball bearing 56 and retained against upward displacement by ring 57. Hub 55 extends downwardly beyond drum 45 at 58 to present a transverse or horizontal bottom surface 59 engageable by the upper end of spring 22. The hub has two ears or lugs 62 extending outwardly at diametrically opposite locations. A pair of substantially semi-circular weights or brake elements 63 are pivotally mounted to ears 62 by pins 64. For this purpose, each element 63 may have a pair of vertically spaced horizontal end projections 65, between which the corresponding ear of hub 55 is received, and having openings 78 registering with hub opening 79 for receiving pin 64. On its bottom surface, each element 63 carries a pair of depending spaced lugs 66 and 67. As best seen in Fig. 5, springs 68 and 69 extend between the opposite lugs of the two elements to normally retain them inwardly and away from engagement with cylindrical wall 51 of the brake drum.

In using the apparatus, manual withdrawal of either hose causes rotation of the corresponding drum unit 21, and, by virtue of the threaded connection between shaft 20 and nut 31, results in upward axial movement of the drum unit against the influence of spring 22, as to the condition of Fig. 3. When the hose is then released, spring 22 exerts a downward force against the drum unit to effect its rotational and axial movement back to the normal condition of Fig. 2.

Spring 22 rotates with the drum unit as a result of its frictional engagement with ring 33, and transmits that rotation to the inner brake mechanism 46. As the take-up or retracting speed of the drum unit increases under the influence of spring 22, the corresponding rotation of mechanism 46 tends to centrifugally displace brake elements 63 outwardly against the tendency of springs 68 and 69. Upon the attainment of a predetermined optimum speed, elements 63 frictionally engage cylindrical wall 51 of the brake drum to restrain the drum against further increase in speed. Consequently, the hose is steadily retracted by the reeling mechanism at a safe maximum speed. However, if the hose is slowed or hung up for any reason, the resultant decrease in centrifugal force permits the inward retraction of elements 63 with the brake drum, resulting in the exertion of the entire force of spring 22 toward resuming hose retraction.

I claim:

1. A reeling unit comprising a vertically extending housing, a hose winding drum rotatable in said housing about a vertical axis, a spring rotatable with the drum and operable to rotatably urge the drum in a hose-take-up direction, and a rotatable brake mechanism positioned in vertical alinement with the drum and rotatably driven by said spring to restrain spring-influenced rotation of the drum.

2. A reeling mechanism comprising a winding drum, means mounting the drum for rotational and axial movements, a spring rotatable with the drum and exerting against the drum in the direction of its axis a force for imparting rotational and axial movements thereto, and a rotatable brake mechanism rotatably driven by said spring to restrain spring-influenced rotation of the drum.

3. A reeling mechanism comprising a winding drum, means mounting the drum for rotational and axial movements, a spring rotatable with the drum and exerting against the drum in the direction of its axis a force for imparting rotational and axial movements thereto, and a rotatable brake mechanism positioned in axial alinement with the drum and rotatably driven by said spring to restrain spring-influenced rotation of the drum.

4. A reeling mechanism comprising a winding drum, means mounting the drum for rotational and axial movements, a coil spring exerting against the drum in the direction of its axis a force for imparting rotational and axial movements thereto, and a rotatable centrifugal brake disposed in axial alinement with said drum and operating to restrain spring-influenced rotation of the drum, said spring extending axially between said drum and brake to transmit drum rotation to the brake.

5. A reeling mechanism comprising a screw shaft, a nut on the shaft, a winding drum surrounding the shaft and associated with the nut, the drum and nut being rotatable and movable longitudinally of the shaft in response to force applied axially of the drum and nut, and a coil spring surrounding the shaft and acting to apply said force, said spring being mounted for rotation with the drum, said drum being displaceable from a starting position to compress said spring upon rotation of the drum in an unwinding direction and the spring then acting to return the drum to said starting position.

6. A reeling mechanism comprising a screw shaft, a nut on the shaft, a winding drum surrounding the shaft and associated with the nut, the drum and nut being rotatable and movable longitudinally of the shaft in response to force applied axially of the drum and nut, a coil spring surrounding the shaft and acting to apply said force, said spring being mounted for rotation with the drum, said drum being displaceable from a starting position to compress said spring upon rotation of the drum in an unwinding direction and the spring then acting to return the drum to said starting position, and a rotatable brake mechanism driven by said spring and operating to restrain spring-influenced rotation of the drum.

7. A reeling mechanism comprising a vertically extending housing, a stationary shaft extending vertically in said housing and having an externally threaded portion, a winding drum mounted by said threaded portion of the shaft for rotational and axial movements, a coil spring extending about said shaft and exerting against the drum in the direction of its axis a force for imparting rotational and axial movements thereto, and a centrifugally actuated brake positioned in axial alinement with said drum and including mechanism rotatable in response to spring influenced rotation of said drum and operating to limit the speed thereof.

8. A reeling mechanism comprising a winding drum, a shaft having a threaded portion and mounting the drum by virtue of said threaded portion for rotational and axial movements, means for exerting against the drum a force for imparting rotational and axial movements thereto, and a brake disposed about said shaft and operating to restrain rotational and axial movements of the drum by said means.

9. A reeling mechanism comprising a housing, a shaft stationarily mounted in said housing and having a threaded portion, a winding drum mounted about said threaded portion of the shaft for rotational and axial movements, a spring exerting against the drum in the direction of its axis a force for imparting rotational and axial movements thereto, and a centrifugally actuated brake acting to restrain said rotational and axial movements of the drum and including a rotating section mounted for rotation about said shaft.

10. A reeling mechanism comprising a housing, a winding drum, means mounting the drum in the housing for rotational and axial movements, means exerting against the drum a force for imparting rotational and axial movements thereto, and a brake unit mounted at a fixed location in said housing and acting to restrain rotational and axial movements of the drum by said force exerting means.

11. A hose reeling mechanism comprising a housing, a winding drum, means mounting said drum in the housing for rotational and axial movements, a spring exerting against the drum a force for imparting rotational and axial movements thereto, a brake drum stationarily mounted in said housing, and a brake mechanism at the inside of the drum rotatable in response to spring influenced rotation of the winding drum and operating to engage the brake drum and restrain said spring influenced rotation of the winding drum.

12. A hose reeling mechanism comprising a housing, a shaft stationarily mounted in said housing and having a threaded portion, a hose winding drum mounted about said threaded portion of the shaft to be rotatable and movable axially in response to force exerted axially thereagainst, a spring acting to apply said axial force against the drum, a hub carried by the shaft and rotatable thereabout in response to said drum rotation, a brake element carried by the hub and displaceable outwardly upon rotation thereof, and a brake drum disposed about said shaft and brake element in fixed relation to the housing and engageable by said element upon the attainment of a predetermined speed of drum rotation to restrain further increase in said speed.

13. A reeling mechanism comprising a vertically extending housing, a vertical shaft stationarily mounted in said housing and having a lower externally threaded portion and an upper cylindrical portion, a nut on the threaded portion of the shaft, a winding drum surrounding the shaft and carried by the nut, the drum and nut being rotatable and movable downwardly in response to force applied downwardly thereagainst, a coil spring surrounding the shaft above the nut and acting to apply said downward force, said spring being mounted for rotation with the drum, said drum being displaceable upwardly from a starting position to compress the spring upon rotation of the drum in an unwinding direction and the spring then acting to return the drum to said starting position, and a centrifugally actuated brake acting to limit the speed of said spring influenced movements of the drum and including a rotating section mounted for rotation about said upper portion of the shaft, said rotating section of the brake being engaged and driven by the upper end of said spring.

14. A reeling mechanism comprising a vertically extending housing, a vertical shaft stationarily mounted in said housing and having a lower externally threaded portion and an upper cylindrical portion, a nut on the threaded portion of the shaft, a winding drum surrounding the shaft and carried by the nut, the drum and nut being rotatable and movable downwardly in response to force applied downwardly thereagainst, a coil spring surrounding the shaft above the nut and acting to apply said downward force, said spring being mounted for rotation with the drum, said drum being displaceable upwardly from a starting position to compress the spring upon rotation of the drum in an unwinding direction and the spring then acting to return the drum to said starting position, and a centrifugally actuated brake acting to limit the speed of said spring influenced movements of the drum, said brake including a hub mounted for rotation about said upper portion of the shaft and engaged and driven by said upper end of the spring, a plurality of weighted brake elements carried by the hub and displaceable outwardly upon rotation thereof, and a brake drum disposed about said shaft, hub and brake elements in fixed relation to the housing and engageable by said elements upon the attainment of a predetermined speed of drum rotation to restrain further increase in said speed.

CARL A. ROSTINE.

REFERENCES CITED

The following references are of record in the file of this patent:

UNITED STATES PATENTS

| Number | Name | Date |
|---|---|---|
| 641,466 | O'Brien | Jan. 16, 1900 |
| 1,341,242 | Nikander | May 25, 1920 |
| 2,122,315 | Frosty | June 28, 1938 |
| 2,478,540 | Martin | Aug. 9, 1949 |

FOREIGN PATENTS

| Number | Country | Date |
|---|---|---|
| 11,790 | Great Britain | May 17, 1912 |